United States Patent [19]

Suh et al.

[11] Patent Number: 4,916,166

[45] Date of Patent: Apr. 10, 1990

[54] INSULATING ALKENYL AROMATIC POLYMER FOAM

[75] Inventors: Kyung W. Suh; Jerry L. Severson, both of Granville, Ohio

[73] Assignee: The Dow Chemical Company, Midland, Mich.

[21] Appl. No.: 397,340

[22] Filed: Aug. 22, 1989

Related U.S. Application Data

[63] Continuation of Ser. No. 258,750, Oct. 17, 1988, abandoned.

[51] Int. Cl.$^4$ ................................................. C08J 9/14
[52] U.S. Cl. ........................................ 521/98; 264/53; 521/79; 521/146; 521/147
[58] Field of Search ................... 521/79, 98, 146, 147; 264/53

[56] References Cited

U.S. PATENT DOCUMENTS

| 3,960,792 | 6/1976 | Nakamura | 521/79 |
| 4,438,224 | 3/1984 | Suh | 521/146 |
| 4,636,527 | 1/1987 | Suh | 521/79 |

FOREIGN PATENT DOCUMENTS 1086450 9/1980 Canada.

Primary Examiner—Morton Foelak

[57] ABSTRACT

Alkenyl aromatic thermoplastic synthetic resinous elongate foam bodies having a machine direction, a traverse direction and closed noninterconnecting gas-containing cells are prepared using 1,1-difluoro-1-chloroethane as a blowing agent. These foam bodies have an average cell size of 0.05 to 2.0 millimeters, a minimum cross-sectional dimension of at least 0.25 inch, a cross-sectional area of at least 8 square inches, a water vapor permeability not greater than 1.8 perm inch, a density not exceeding 2.4 pounds per cubic foot, and an absolute dimensional stability of less than 4 percent in any direction when measured by the test designated ASTM D2126/C578. Also disclosed is a method for preparing such foam bodies, other alkenyl aromatic thermoplastic synthetic resinous elongate foam bodies having the same criteria, except a density from 2.4 to 5.0 pounds per cubic foot and a method for preparing such greater density foam bodies.

7 Claims, No Drawings

INSULATING ALKENYL AROMATIC POLYMER FOAM

CROSS-REFERENCE TO RELATED APPLICATION

This is a continuation of application Ser. No. 258,750 filed Oct. 17, 1988 now abandoned.

BACKGROUND OF THE INVENTION

This invention relates to a dimensionally stable insulating alkenyl aromatic polymer foam extruded in large cross sections employing a specific blowing agent or blowing agent mixture. This invention also relates to its method of preparation.

One major application for alkenyl aromatic, such as styrene, polymer foams is in the field of thermal insulation. Desirably a styrene polymer foam for thermal insulation has an average cell size of less than about 0.5 millimeters and excellent dimensional stability.

One manner in which the thermal insulation value of styrene polymer foams is increased is by the addition of certain fully-halogenated compounds, such as dichlorodifluoromethane, into the styrene polymer foam as a blowing/insulating agent. Such a compound, when contained in the cells of the extruded styrene polymer foam, increases the thermal insulation value.

Another major consideration for extruded styrene polymer foam is dimensional stability. Dimensional stability is particularly important when the extruded styrene polymer foam is employed in construction uses or is laminated to a cementitious layer. For most commercial applications regular rectangular forms are required and while a distorted shape can be cut into a rectangular form, considerable product is lost in cutting and must be discarded as scrap. Another consideration is that if an extruded styrene polymer foam product is not dimensionally stable, then the foamed polystyrene must be maintained in storage for a sufficient length of time until substantially all dimensional instability, such a shrinking, swelling, warping or bulging has stopped.

Still another important consideration is the choice of a blowing/insulating agent. Certain of these agents, particularly fully-halogenated compounds such as dichlorodifluoromethane, when released to the atmosphere upon extrusion of the styrene polymer foam or upon aging of the foam are believed to cause harm to the atmosphere. Thus, it is desirable to reduce or eliminate these fully-halogenated compounds.

Canadian Patent No. 1,086,450, hereby incorporated by reference, refers to this problem and proposes a variety of low permeability, insulating/blowing agents, or mixtures of those agents, having a permeability through an alkenyl aromatic resinous polymer of not greater than 0.017 times the permeability of nitrogen through the body, a thermal conductivity of 0.07±20 percent British Thermal Units-inch per hour per square foot per degree Fahrenheit and having the following formula:

$$R_1\text{-}CF_2\text{-}R_2$$

wherein $R_1$ is a methyl, ethyl, chloromethyl, dichloromethyl, difluoromethyl, chlorofluoromethyl, fluoromethyl, or trifluoromethyl radical and $R_2$ is hydrogen or a chloro, fluoro, methyl or trifluoromethyl radical with the further characterization that the compound contain no more than 3 carbon atoms and if the compound contains as halogen only 2 fluorine atoms, the compound muast have 3 carbons.

However, in Table II of the Canadian patent, it can be seen that polystyrene foam prepared from certain blowing agents, particularly 1,1-difluoro-1-chloroethane, have a dimensional stability which is excessive. This is particularly noted in Example 16.

U.S. Pat. No. 3,960,792, hereby incorporated by reference, teaches how to prpeare a dimensionally stable expanded closed cell polystyrene foam body while employing as the fluid foaming agent a volatile material which has a diffusion rate through the polystyrene resin about 0.75 to 6 times the diffusion rate of air through polystyrene resin with the foaming agent being a mixture of at least two compounds having carbon chemically combined therein.

U.S. Pat. No. 4,636,527, hereby incorporated by reference, teaches how to prepare an expanded closed cell polystyrene foam body while employing as the fluid foaming agent a mixture of carbon dioxide and ethyl chloride. Optionally dichlorodifluoromethane, 1,1-difluoro-1-chloroethane and mixtures thereof may also be included as part of the blowing agent mixture.

There is a need to be able to produce a dimensionally stable extruded polystyrene foam body with a non-fully halogemated insulating/blowing agent.

More particularly there is a need to be able to produce a dimensionally stable extruded polystyrene foam body with 1,1-difluoro-1-chloroethane as an insulating/blowing agent.

SUMMARY OF THE INVENTION

The present invention is an alkenyl aromatic thermoplastic synthetic resinous elongated foam body having a machine direction and a transverse direction with the body having a plurality of closed noninterconnecting gas-containing cells.

The cells have an average cell size of from about 0.05 to about 2.0 millimeters when measured across a minimum cross-sectional dimension of the body, with the body being of a generally uniform cellular structure without substantial discontinuities.

The body has a cross-sectional area of at least 8 square inches (51.6 square centimeters) with a minimum cross-sectional dimension of at least about 0.25 inch (6.35 millimeters), a water vapor permeability not greater than about 1.8 perm inch (3.02 metric perm centimeters) a density of from about 1.0 to about 2.4 pounds per cubic foot (16 to 38 kilograms/cubic meter).

Further limitations are that the cells contain, as gas, 1,1-difluoro-1-chloroethane and that any change in dimension in any direction be about four percent (absolute, meaning a positive or negative value) or less when measured by the test designated ASTM D2126/C578.

Also contemplated with the scope of the present invention are process conditions for making these alkenyl aromatic thermoplastic synthetic resinous elongate foam bodies at various densities.

To make these alkenyl aromatic thermoplastic synthetic resinous elongate foam bodies at densities of about 1.0 to about 2.4 pounds per cubic foot (16 to 38 kilograms/cubic meter) the extrusion of the alkenyl aromatic thermoplastic synthetic resinous elongate foam body must be at about 115 degrees centigrade or greater.

To make these alkenyl aromatic thermoplastic synthetic resinous elongate foam bodies at densities of about 2.4 to about 5.0 pounds per cubic foot (38 to 80 kilograms/cubic meter) the extrusion of the alkenyl aromatic thermoplastic synthetic elongate foam body must be at about 118 degrees centigrade or less.

DETAILED DISCUSSION OF ILLUSTRATIVE EMBODIMENTS

The volatile fluid foaming agents used to prepare the foams of the present invention are those having at least 70 percent by weight 1,1-difluoro-1-chloroethane based on total blowing agent mixture weight. Preferably the blowing agent is 100 percent 1,1-difluoro-1-chloroethane (HCFC-142b). Any remaining part of the blowing agent mixture can be any other chemical or physical blowing agent. Preferably the remaining part of the blowing agent mixture is water ($H_2O$), 1 to 4 carbon aliphatic hydrocarbons, such as ethane, chlorodifluoromethane (HCFC-22), 1,2-difluoroethane (HCFC-152a), carbon dioxide ($CO_2$) (provided the carbon dioxide does not exceed about 6 weight percent), a chemical blowing agent mix of sodium bicarbonate and boric acid and mixtures of the above, including specifically $CO_2$ and $H_2O$, 1 to 4 carbon aliphatic hydrocarbons and $CO_2$ and a chemical blowing agent mix of sodium bicarbonte and boric acid and $CO_2$.

Preferably the blowing agents and their mixtures (weight percent based on total blowing agent mixture weight) are as follows:
1. 100% HCFC-142b;
2. 94–100% HCFC-142b/0–6% CO2;
3. 70–100% HCFC-142b/0–30 sodium bicarbonate (optionally including boric acid);
4. 70–100% HCFC-142b/0–30 H2O;
5. 70–100% HCFC-142b/0–30 (CO2/H20) (6% or less CO2);
6. 70–100% HCFC-142b/0–30 ethane;
7. 70–100% HCFC-142b/0–30 (CO2/ethane) (6% or less CO2);
8. 70–100% HCFC-142b/0–30 HCFC-22, preferably 80–100% HCFC-142b/0–20 HCFC-22;
9. 70–100% HCFC-142b/0–30 HCFC-152a.

The term 'alkenyl aromatic synthetic resin' refers to a solid polymer of one or more polymerizable alkenyl aromatic compounds. The polymer or copolymer comprises in chemically combined form, at least 60 percent by weight of at least one alkenyl aromatic compound having the general formula

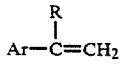

wherein Ar represents an aromatic hydrocarbon radical, or an aromatic halo-hydrocarbon radical of the benzene series, and R is hydrogen or the methyl radical. Examples of such alkenyl aromatic resins are the solid homopolymers of styrene, alpha-methylstyrene, o-methylstyrene, m-methylstyrene, p-methylstyrene, ar-ethylstyrene, ar-vinylstyrene, ar-chlorostyrene or ar-bromostyrene; and the solid copolymers of two or more of such alkenyl aromatic compounds with minor amounts of other readily polymerizable olefinic compounds such as, for example, methylmethacrylate, acrylonitrile, maleic anhydride, citraconic anhydride, itaconic anhydride, acrylic acid, and rubber reinforced (either natural or synthetic) styrene polymers.

The preparation of alkenyl aromatic resinous polymer foams in accordance with the present invention is most conveniently done in a known manner wherein the alkenyl aromatic synthetic resin is heat-plastified within an extruder. From the extruder the heat plastified resin is passed into a mixer, for example a rotary mixer wherein a studded rotor is enclosed within a housing which has a studded internal surface which intermeshes with the studs on the rotor. The heat-plastified resin and a volatile fluid foaming agent are fed into the inlet end of the mixer and discharged from the outlet end, the flow being in a generally axial direction. From the mixer, the gel passes through coolers and from the coolers to a die which extrudes a generally rectangular board.

In the preparation of foams in accordance with the present invention, it is often desirable to add a nucleating agent such as, for example talc, calcium silicate, or indigo to reduce the cell size.

EXAMPLES

The following examples in Tables 1 and 2 are prepared from polystyrene having a weight average molecular weight of about 200,000 calcium stearate (in amounts ranging from about 0.00 to about 0.08 weight parts per hundred based on resin weight) and talc (in amounts ranging from about 0.00 to about 0.08 weight parts per hundred based on resin weight).

These ingredients are added to an extruder and melted at a temperature of about 200° C. and a pressure of about 2000 psi (pounds per square inch).

This mixture of heat-plastified ingredients and the volatile blowing agent mixture (having at least about 70 weight percent by total blowing agent weight 1,1-difluoro-1-chloroethane) is then introduced into the inlet end of the mixer where the mixture is thoroughly mixed.

This mixture is then cooled to a foaming temperature, extruded through a slit die and expanded between a pair of substantially parallel plates to form a foam board having a rectangular cross-section of at least 8 square inches (51.6 square centimeters) with a minimum cross-sectional dimension of at least about 0.25 inch (6.35 millimeters).

For the dimensional stability testing the specimens in Tables 1 and 2 are prepared according to ASTM D-2126/C578. The dimensions of the specimens are approximately 4 inches by 4 inches by 1 inch. After conditioning the dimensions of the three principal axes (vertical, horizontal and extrusion) of the specimens are taken to the nearest ±0.1%.

The specimens are then exposed to a temperature of 70±2° C. (158±4° F.) and a relative humidity of 97±3% for a period of 7 days. After cooling at room temperature for 2 hours the dimensions of the three principal axes (vertical, horizontal and extrusion) of the specimens are again taken to the nearest ±0.1%. The percentage dimensional change in each of the three principal axes, positive or negative, is then determined to the nearest 0.1%.

TABLE 1

| Effect of Density and Foaming Temperature on Dimensional Stability | | | | | | |
|---|---|---|---|---|---|---|
| Blowing Agent Type and Amount (pph)[1] | Foaming Temperature °C.[1] | Density pcf[1] | Cell Size mm[1] | Dimensional Stability %[2] | | |
| | | | | V[1] | E[1] | H[1] |
| (12)HCFC-142b | 126 | 2.33 | 1.32 | 1.0 | 1.5 | 1.3 |
| (12)HCFC-142b* | 126 | 2.63 | 1.32 | −5.1 | 1.5 | 0.05 |
| (12)HCFC-142b* | 126 | 2.73 | 1.25 | 9.3 | 2.1 | 0.2 |

TABLE 1-continued
Effect of Density and Foaming Temperature on Dimensional Stability

| Blowing Agent Type and Amount (pph)[1] | Foaming Temp- erature °C.[1] | Density pcf[1] | Cell Size mm[1] | Dimensional Stability %[2] | | |
|---|---|---|---|---|---|---|
| | | | | V[1] | E[1] | H[1] |
| (16)HCFC-142b | 128 | 1.91 | 1.28 | 2.4 | 1.3 | 1.7 |
| (16)HCFC-142b | 118 | 2.08 | 0.58 | 1.8 | 2.5 | 3.2 |
| (16)HCFC-142b | 121 | 2.11 | 0.25 | 1.9 | 0.5 | 3.0 |
| (16)HCFC-142b | 115 | 2.37 | 0.6 | 2.4 | 1.0 | 3.3 |
| (14.5)HCFC-142b (0.4)CO$_2$ | 124 | 2.03 | 0.21 | 1.1 | 1.1 | 1.7 |
| (14.5)HCFC-142b (0.4)CO$_2$ | 127 | 1.87 | 0.19 | 1.1 | 2.2 | 1.0 |
| (13.0)HCFC-142b (2.3)HCFC-22 | 124 | 1.94 | 1.08 | 1.6 | 1.9 | 2.0 |
| (13.0)HCFC-142b (2.3)HCFC-22 | 118 | 2.24 | 1.65 | 1.2 | 1.4 | 2.2 |

*Not examples of the present invention.
[1]V = vertical direction; E = extrusion direction; H = horizontal direction; pph = weight parts per hundred weight parts of resin; °C. = degrees centigrade; pcf = pounds per cubic foot; mm = millimeters;
[2]As measured by ASTM D2126/C578

Normally it would be expected that the dimensional stability of the foam board would increase with an increase in density. However looking at Table I it can be seen that the opposite is actually true. A density of about 2.4 pounds per cubic foot or less produces a foam board having an absolute dimensional stability in any direction of about four percent or less when measured by the test for dimensional stability designated ASTM D2126/C578. It should also be noted that all samples of the foam board had a foaming temperature at the die in excess of 115° C. or greater.

TABLE 2
Effect of Density and Foaming Temperature on Dimensional Stability

| Blowing Agent Type and Amount (pph)[1] | Foaming Temp- erature °C.[1] | Density pcf[1] | Cell Size mm[1] | Dimensional Stability %[2] | | |
|---|---|---|---|---|---|---|
| | | | | V[1] | E[1] | H[1] |
| (16)HCFC-142b | 110 | 2.64 | 0.75 | 3.5 | 0.7 | 3.8 |
| (16)HCFC-142b | 110 | 2.62 | 0.76 | 3.5 | 1.0 | 3.4 |
| (14.5)HCFC-142b (0.4)CO$_2$ | 118 | 2.64 | 0.17 | 0.1 | 0.8 | 2.8 |
| (14.5)HCFC-142b (0.4)CO$_2$ | 118 | 2.95 | 0.16 | −0.2 | 0.7 | 3.0 |

[1]V = vertical direction; E = extrusion direction; H = horizontal direction; pph = weight parts per hundred weight parts of resin; °C. = degrees centigrade; pcf = pounds per cubic foot; mm = millimeters;
[2]As measured by ASTM D2126/C578

As can be seen in Table 2 foam boards having a density greater than about 2.4 pounds per cubic foot and a dimensional stability in any direction of about four percent or less when measured by the test for dimensional stability designated ASTM D2126/C578 can be produced by decreasing the foaming temperature to below about 118° C.

As is apparent from this specification, the present invention is susceptible of being embodied with various alterations and modifications which may differ in some respect from those examples described in this specification and description. For this reason it is to be fully understood that this specification and description is intended to be merely illustrative and is not to be construed or interpreted as being restrictive or otherwise limiting of the present invention.

What is claimed is:

1. An alkenyl aromatic thermoplastic synthetic resinous elongate foam body comprising the body having a machine direction and a transverse direction and defining a plurality of closed noninterconnecting gas-containing cells therein, the cells having an average cell size of from about 0.05 to about 2.0 millimeters when measured across a minimum cross-sectional dimension of the body, the body being of a generally uniform celluloar structure without substantial discontinuities, the body having a cross-sectional area of at least 8 square inches (51.6 square centimeters) with a minimum cross-sectional dimension of at least about 0.25 inch (6.35 millimeters), a water vapor permeability not greater than about 1.8 per inch (3.02 metric perm centimeters) a density of from about 1.0 to about 2.4 pounds per cubic foot (16 to 38 kilograms/cubic meter) with the further limitations that the cells contain, as gas, 1,1-difluoro-1-chloroethane and that any change in dimension in any direction be about four percent or less when measured by the test designated ASTM D2126/C578.

2. An alkenyl aromatic thermoplastic synthetic resinous elongate foam body, as recited in claim 1, wherein the alkenyl aromatic thermoplastic synthetic resin is polystyrene.

3. An alkenyl aromatic thermoplastic synthetic resinous elongate foam body comprising the body extruded at a die temperature of about 115 degrees centigrade or greater, having a machine direction and a transverse direction and defining a plurality of closed noninterconnecting gas-containing cells therein, the cells having an average cell size of from about 0.05 to about 2.0 millimeters when measured across a minimum cross-sectoional dimension of the body, the body being of a generally uniform cellular structure without substantial discontinuities, the body having a cross-sectional area of at least 8 square inches (51.6 square centimeters) with a minimum cross-sectional dimension of at least about 0.25 inch (6.35 millimeters), a water vapor permeability not greater than about 1.8 per inch (3.02 metric perm centimeters) a density of from about 1.0 to about 2.4 pounds per cubic foot (16 to 38 grams/liter) with the further limitations that the cells contain, as gas, 1,1-difluoro-1-chloroethane and that any change in dimension in any direction be about four percent or less when measured by the test designated ASTM D2126/C578.

4. An alkenyl aromatic thermoplastic synthetic resinous elongate foam body, as recited in claim 3, wherein the alkenyl aromatic thermoplastic synthetic resin is polystyrene.

5. An alkenyl aromatic thermoplastic synthetic resinous elongate foam body comprising the body extruded at a die temperature of about 118 degrees centigrade or less, having a machine direction and a transverse direction and defining a plurality of closed noninterconnecting gas-containing cells therein, the cells having an average cell size of from about 0.05 to about 2.0 millimeters when measured across a minimum cross-sectional dimension of the body, the body being of a generally uniform cellular structure without substantial discontinuities, the body having a cross-sectional area of at least 8 square inches (51.6 square centimeters) with a minimum cross-sectional dimension of at least about 0.25 inch (6.35 millimeters), a water vapor permeability not greater than about 1.8 perm inch (3.02 metric perm centimeters) a density of from about 2.4 to about 5.0 pounds per cubic foot (38 to 80 grams/liter) with the further limitations that the cells contains, as gas, 1,1-diflouro-1-chloroethane and that any change in dimension in any direction be about four percent of less when measured by the test designated ASTM D2126/C578.

6. An alkenyl aromatic thermoplastic synthetic resinous elongate foam body, as recited in claim 5, wherein the density is from about 2.4 to about 3.5 pounds per cubic foot (38 to 56 grams/liter).

7. An alkenyl aromatic thermoplastic synthetic resinous elongate foam body, as recited in claim 6, wherein the alkenyl aromatic thermoplastic synthetic resin is polystyrene.

* * * * *

UNITED STATES PATENT AND TRADEMARK OFFICE
CERTIFICATE OF CORRECTION

PATENT NO. : 4,916,166

DATED : April 10, 1990

INVENTOR(S) : Kyung Won Suh and Jerry L. Severson

It is certified that error appears in the above-identified patent and that said Letters Patent is hereby corrected as shown below:

Column 2, line 2, "muast" should correctly appear as --must--.

Column 2, line 9, "prpeare" should correctly appear as --prepare--.

Column 2, line 35. "elongated" should correctly appear as --elongate--.

Column 2, line 56, "with" should correctly appear as --within--.

Column 3, lines 24 and 25, "bicarbonte" should correctly appear as --bicarbonate--.

Column 6, lines 6 and 7, "celluloar" should correctly appear as --cellular--.

Column 6, line 12, "per" should correctly appear as --perm--.

Column 6, line 38, "per" should correctly appear as --perm--.

Column 7, line 1, "of" should correctly appear as --or--.

Signed and Sealed this

Thirtieth Day of June, 1992

Attest:

DOUGLAS B. COMER

*Attesting Officer*   *Acting Commissioner of Patents and Trademarks*